(12) United States Patent
Hidvegi et al.

(10) Patent No.: US 8,495,535 B2
(45) Date of Patent: Jul. 23, 2013

(54) PARTITIONING AND SCHEDULING UNIFORM OPERATOR LOGIC TREES FOR HARDWARE ACCELERATORS

(75) Inventors: Zoltan T. Hidvegi, Round Rock, TX (US); Michael D. Moffitt, Austin, TX (US); Matyas A. Sustik, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/305,156

(22) Filed: Nov. 28, 2011

(65) Prior Publication Data

US 2013/0139119 A1    May 30, 2013

(51) Int. Cl.
*G06F 17/50* (2006.01)

(52) U.S. Cl.
USPC .......................................................... 716/106

(58) Field of Classification Search
USPC .................................. 716/106, 132
See application file for complete search history.

(56) References Cited

U.S. PATENT DOCUMENTS

| | | | |
|---|---|---|---|
| 5,537,580 A | 7/1996 | Giomi et al. | |
| 6,609,229 B1 | 8/2003 | Ly et al. | |
| 6,772,399 B2 | 8/2004 | Saluja et al. | |
| 7,107,568 B2 | 9/2006 | Cronquist | |
| 7,290,228 B2 | 10/2007 | Guenther et al. | |
| 7,337,100 B1 | 2/2008 | Hutton et al. | |
| 7,509,618 B1 | 3/2009 | Hutton et al. | |
| 7,827,016 B1 | 11/2010 | Ho | |
| 2009/0193294 A1* | 7/2009 | Nakamura et al. | 714/26 |

OTHER PUBLICATIONS

Xiang, Hu, et al., "Logical and Physical Restructuring of Fan-in Trees," Proc. 19th Int'l. Symposium on Physical Design (Mar. 2010).

* cited by examiner

*Primary Examiner* — Vuthe Siek
(74) *Attorney, Agent, or Firm* — Matthew W. Baca; Jack V. Musgrove

(57) ABSTRACT

A circuit design is compiled for hardware-accelerated functional verification by removing internal gates of a uniform operator tree (e.g., an assertion tree) while retaining node information, and partitioning the circuit to optimize connectivity without being constrained by the uniform operator tree. After partitioning, sub-trees are constructed for the partitions, and aggregated to form a master tree. The sub-trees can have leaf nodes at varying depths based on ranks of the leaf nodes, and the master tree can similarly provide inputs from the sub-trees at varying depths based on simulation depths for the sub-trees. The resynthesized master tree is structurally distinct from the original uniform operator tree but, since the inputs are commutative (e.g., OR gates), the functional equivalence of the model is preserved.

24 Claims, 5 Drawing Sheets

PARTITIONING AND SCHEDULING UNIFORM OPERATOR LOGIC TREES FOR HARDWARE ACCELERATORS

BACKGROUND OF THE INVENTION

1. Field of the Invention

The present invention generally relates to allocation of computational resources, and more particularly to a method of partitioning an integrated circuit design having an assertion tree to optimize simulation of the design using hardware acceleration.

2. Description of the Related Art

Integrated circuits are used for a wide variety of electronic applications, from simple devices such as wristwatches, to the most complex computer systems. A microelectronic integrated circuit (IC) chip can generally be thought of as a collection of logic cells with electrical interconnections between the cells, formed on a semiconductor substrate (e.g., silicon). An IC may include a very large number of cells and require complicated connections between the cells. A cell is a group of one or more circuit elements such as transistors, capacitors, resistors, inductors, and other basic circuit elements combined to perform a logic function. Cell types include, for example, core cells, scan cells, input/output (I/O) cells, and memory (storage) cells. Each of the cells of an IC may have one or more pins, each of which in turn may be connected to one or more other pins of the IC by wires. The wires connecting the pins of the IC are also formed on the surface of the chip. For more complex designs, there are typically at least four distinct layers of conducting media available for routing, such as a polysilicon layer and three metal layers (metal-1, metal-2, and metal-3).

An IC chip is created by first conceiving the logical circuit description, and then converting that logical description into a physical description, or geometric layout. This process is usually carried out using a netlist, which is a record of all of the nets, or interconnections, between the cell pins, including information about the various components such as transistors, resistors and capacitors. A layout typically consists of a set of planar geometric shapes in several layers. The layout is then checked to ensure that it meets all of the design requirements, particularly timing requirements. The result is a set of design files known as an intermediate form that describes the layout. The design files are then run through a dataprep process that is used to produce patterns called masks by an optical or electron beam pattern generator. During fabrication, these masks are used to etch or deposit features in a silicon wafer in a sequence of photolithographic steps using a complex lens system that shrinks the mask image. The process of converting the specifications of an electrical circuit into such a layout is called the physical design.

Cell placement in integrated circuit design involves a determination of where particular cells should optimally (or near-optimally) be located on a surface of an integrated circuit device. Due to the large number of components and the details required by the fabrication process for very large scale integrated (VLSI) devices, physical design is not practical without the aid of computers. As a result, most phases of physical design extensively use computer-aided design (CAD) tools, and many phases have already been partially or fully automated. Automation of the physical design process has increased the level of integration, reduced turn-around time and enhanced chip performance. Several different programming languages have been created for electronic design automation (EDA), including Verilog, VHDL and TDML. A typical EDA system receives one or more high level behavioral descriptions of an IC device, and translates this high level design language description into netlists of various levels of abstraction.

It is important to ensure that an integrated circuit design is going to work properly before proceeding with fabrication preparation. A variety of tests can be performed to evaluate the design, but simulation remains the dominant strategy for functionally verifying high-end microprocessors. A design-under-test is driven by vectors of inputs, and states encountered while walking through the sequence are checked for properties of correctness. This process can be (and often is) performed by software simulation tools; however, such programs cannot compete with the cycle times offered by hardware accelerated simulation. Hardware accelerators are custom-built machines that can increase simulation performance by several orders of magnitude, reducing otherwise month-long software simulations to days or even hours. This improvement is due in part to specialized logic processors and instruction memories, but also due to the parallelism inherent in the hardware realization of logic designs. The cost of building and maintaining a fleet of hardware accelerators is typically on the order of millions of dollars, and thus reflects a significant portion of the verification budget.

In order to scale with model sizes on the order of billions of gates, successful compilation for hardware acceleration relies on a series of decoupled point-tool optimization engines as illustrated in FIG. 1. A gate-level model is first optimized using classical logic synthesis (2). The netlist includes not only behavioral logic for the basic circuit design, but also checker and assertion logic which is used to detect functional errors during the design phase of a VLSI chip. Assertion logic represents expressions (assertions) which are used to characterize the proper behavior of a circuit. Assertions can accordingly provide an indication when system specifications have been violated, and are further useful in tracking down the cause of those violations. Assertion trees can be manually constructed by the designer or verification engineer based on experience, or generated automatically based on predetermined patterns of nodes and connections.

Once the model has been optimized, its components are assigned to a set of technology primitives supported by the accelerator, e.g., 4-input lookup tables (4). A standalone compiler then maps the logical primitives of the netlist to the various resources of the machine such as processors (chips), or multi-chip boards (6). This process can employ several independent steps, including global partitioning across processors or multi-processor boards of the machine as well as detailed scheduling among tightly synchronized processors. These algorithms must carefully navigate the delicate tradeoff between concurrency and communication, and between gate evaluation and routing. A circuit's correct operation is verified in simulation by applying sufficiently large sets of input patterns to the compiled design until the desired level of confidence is reached. The assertion logic allows faster verification as compared to monitoring signal values (or detecting error conditions) using the machine interface or a complementary software process.

SUMMARY OF THE INVENTION

The present invention may be embodied as a method, system, and program product for compiling a circuit design for hardware-accelerated functional verification by receiving a description of the circuit design which includes a nodes interconnected to form a nets having an associated uniform operator logic tree, removing selected components from nodes of the uniform operator logic tree while retaining node information to create a dissolved circuit description, partitioning the dissolved circuit description into multiple partitions which map logical primitives of the dissolved circuit description to resources of a hardware accelerator, constructing uniform operator logic sub-trees for the partitions using the node information, and aggregating the uniform operator logic sub-trees into a master uniform operator logic tree. In the exemplary implementation the uniform operator logic tree is an assertion tree for verification of the circuit design, the uniform operator logic sub-trees are assertion sub-trees, and the master uniform operator logic tree is a master assertion tree. The circuit description can be a gate-level netlist in which case the removed components are internal gates of the uniform operator logic tree. Various partitioning approaches can be used but the partitionment preferably optimizes connectivity by reducing connection cuts between partitions. The selected components for removal can be identified by functional detection of the uniform operator logic tree, or by explicitly marking assertion events in the circuit description. The uniform operator logic sub-trees can have leaf nodes at varying depths based on ranks of the leaf nodes, and the master uniform operator logic tree can similarly provide inputs from the sub-trees at varying depths based on simulation depths for the sub-trees.

The above as well as additional objectives, features, and advantages of the present invention will become apparent in the following detailed written description.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DESCRIPTION OF THE PREFERRED EMBODIMENT(S)

One of the principal drawbacks of existing compiler methodology for hardware acceleration is that the topology of all netlist structures is determined a priori, without the knowledge of where in the machine (both physically and temporally) its sources are likely to reside. This approach is a particular problem with regard to the massive logic tree of OR gates inserted to accumulate all assertions into a single signal (thereby facilitating the detection of any failure by monitoring only the signal at the root of the tree). During the compiling procedure, the ordering of inputs to the leaves of this tree are assigned to machine resources with no particular regard for which of its sources may have stronger affinity, nor can the algorithm anticipate which primitives should be promoted in the tree due to cut paths of long chains. Indeed, the relative adjacencies of netlist elements typically cannot be known until the final levels of partitioning, at which point the nodes of the tree may be widely scattered across the resources of the accelerator.

The subsequent latency introduced between pairs of signals that span cross-chip boundaries is likely to cause an explosion in simulation depth, which in the best case leads to slower simulation speeds and in the worst case the inability to produce a detailed parallel schedule conforming to the restrictions of the given machine architecture (a compilation failure). Hence, the mere presence of these blindly synthesized structures often results in the creation of models that, due to unavoidable partitioning inefficiencies, are incapable of being suitably compiled for the target accelerator architecture.

In practice, the assertion and coverage checker trees often contain millions of events, with each level of the tree introducing more opportunities for cut and latency. The daunting size of these coverage trees is compounded by their tendency to reach across all levels of the hierarchy, differentiating this problem from the modest structures commonly found in physical place-and-route. In the absence of an intelligent integration between synthesis and partitioning, we have observed that the efficiency of the machine (as well as its effective capacity) are often placed in severe jeopardy, threatening the ability to simulate the largest and most important models. In light of the foregoing, it would be desirable to devise an improved method of compiling for hardware acceleration which could handle assertion logic more efficiently. It would be further advantageous if the method could allow the partitioner to manage fixed connectivity of the assertion logic without introducing undue overhead.

Figure 1:
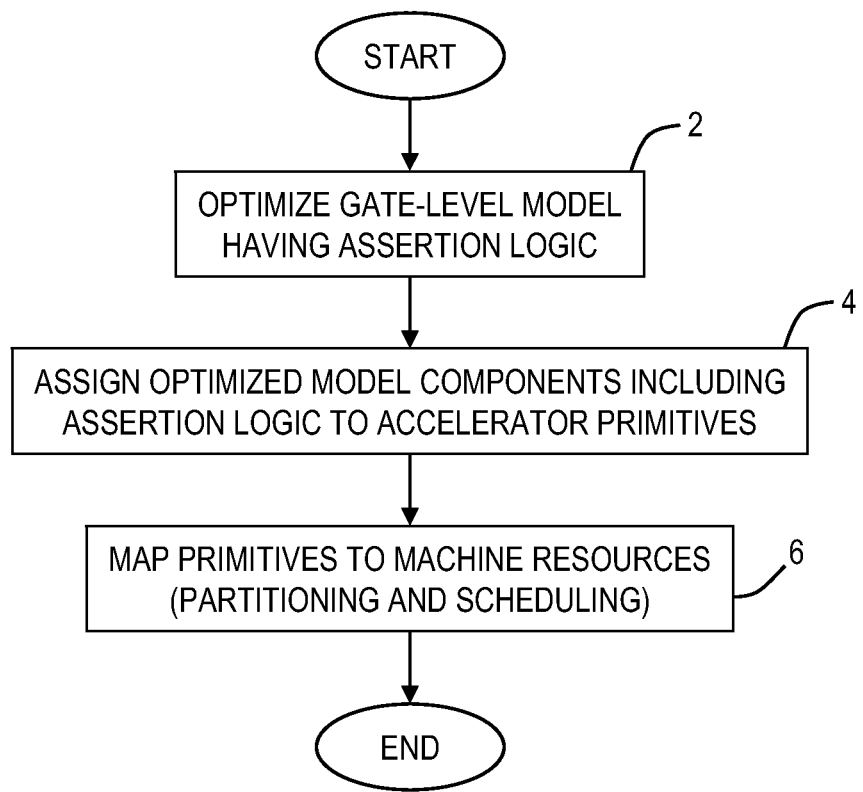
FIG. 1 is a chart illustrating the logical flow for a conventional process for compiling a circuit design for hardware acceleration which uses decoupled point-tool optimization engines.
Figure 2:
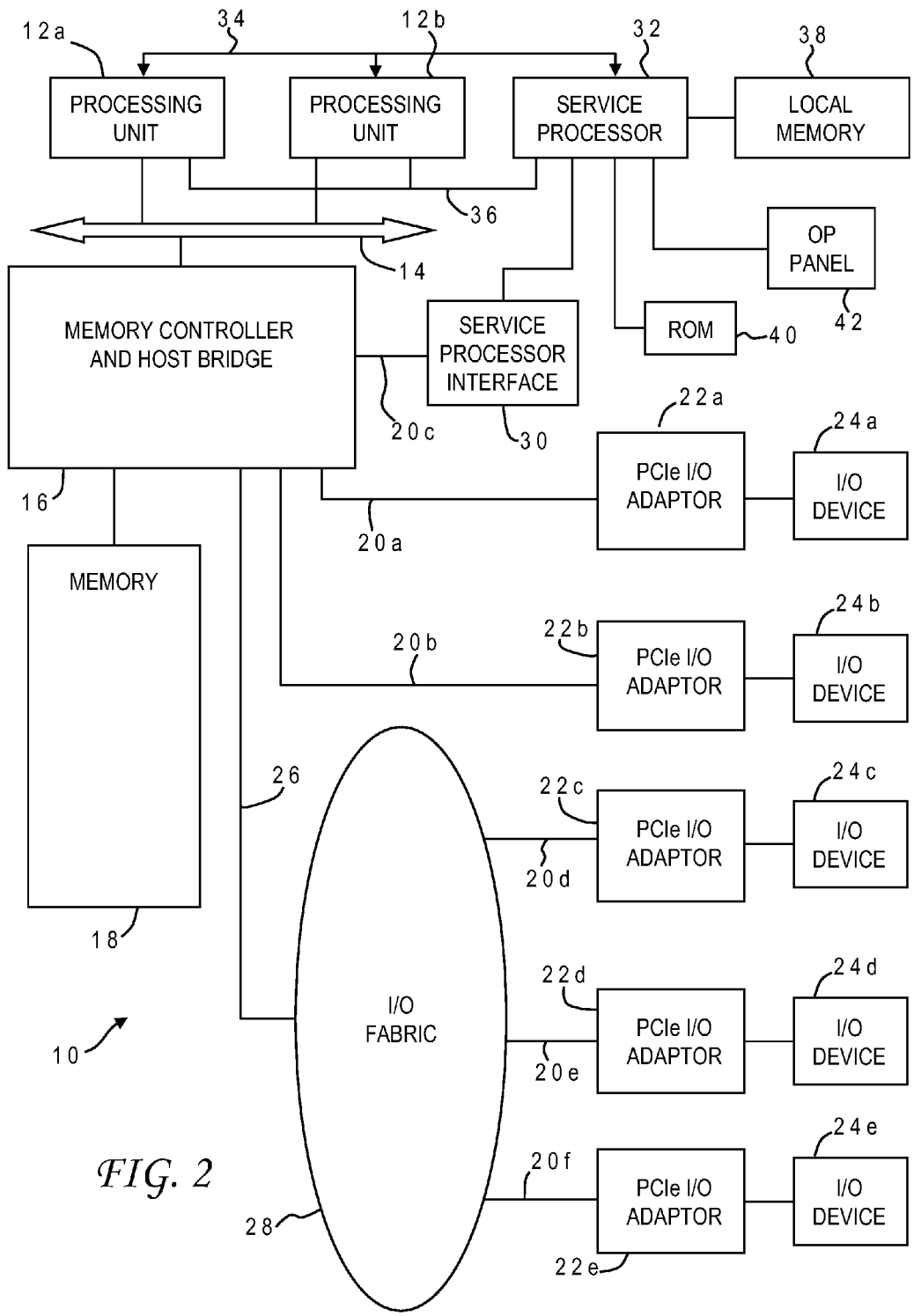
FIG. 2 is a block diagram of a computer system programmed to compile a circuit design for hardware acceleration in accordance with one implementation of the present invention.

With reference now to the figures, and in particular with reference to FIG. 2, there is depicted one embodiment 10 of a computer system in which the present invention may be implemented to carry out partitioning of an integrated circuit design for hardware-accelerated functional verification. Computer system 10 is a symmetric multiprocessor (SMP) system having a plurality of processors 12*a*, 12*b* connected to a system bus 14. System bus 14 is further connected to a combined memory controller/host bridge (MC/HB) 16 which provides an interface to system memory 18. System memory 18 may be a local memory device or alternatively may include a plurality of distributed memory devices, preferably dynamic random-access memory (DRAM). There may be additional structures in the memory hierarchy which are not depicted, such as on-board (L1) and second-level (L2) or third-level (L3) caches.

MC/HB 16 also has an interface to peripheral component interconnect (PCI) Express links 20*a*, 20*b*, 20*c*. Each PCI Express (PCIe) link 20*a*, 20*b* is connected to a respective PCIe adaptor 22*a*, 22*b*, and each PCIe adaptor 22*a*, 22*b* is connected to a respective input/output (I/O) device 24*a*, 24*b*. MC/HB 16 may additionally have an interface to an I/O bus 26 which is connected to a switch (I/O fabric) 28. Switch 28 provides a fan-out for the I/O bus to a plurality of PCI links 20*d*, 20*e*, 20*f*. These PCI links are connected to more PCIe adaptors 22*c*, 22*d*, 22*e* which in turn support more I/O devices 24*c*, 24*d*, 24*e*. The I/O devices may include, without limitation, a keyboard, a graphical pointing device (mouse), a microphone, a display device, speakers, a permanent storage device (hard disk drive) or an array of such storage devices, an optical disk drive, and a network card. Each PCIe adaptor provides an interface between the PCI link and the respective I/O device. MC/HB 16 provides a low latency path through which processors 12a, 12b may access PCI devices mapped anywhere within bus memory or I/O address spaces. MC/HB 16 further provides a high bandwidth path to allow the PCI devices to access memory 18. Switch 28 may provide peer-to-peer communications between different endpoints and this data traffic does not need to be forwarded to MC/HB 16 if it does not involve cache-coherent memory transfers. Switch 28 is shown as a separate logical component but it could be integrated into MC/HB 16.

In this embodiment, PCI link 20c connects MC/HB 16 to a service processor interface 30 to allow communications between I/O device 24a and a service processor 32. Service processor 32 is connected to processors 12a, 12b via a JTAG interface 34, and uses an attention line 36 which interrupts the operation of processors 12a, 12b. Service processor 32 may have its own local memory 38, and is connected to read-only memory (ROM) 40 which stores various program instructions for system startup. Service processor 32 may also have access to a hardware operator panel 42 to provide system status and diagnostic information.

In alternative embodiments computer system 10 may include modifications of these hardware components or their interconnections, or additional components, so the depicted example should not be construed as implying any architectural limitations with respect to the present invention.

When computer system 10 is initially powered up, service processor 32 uses JTAG interface 34 to interrogate the system (host) processors 12a, 12b and MC/HB 16. After completing the interrogation, service processor 32 acquires an inventory and topology for computer system 10. Service processor 32 then executes various tests such as built-in-self-tests (BISTs), basic assurance tests (BATs), and memory tests on the components of computer system 10. Any error information for failures detected during the testing is reported by service processor 32 to operator panel 42. If a valid configuration of system resources is still possible after taking out any components found to be faulty during the testing then computer system 10 is allowed to proceed. Executable code is loaded into memory 18 and service processor 32 releases host processors 12a, 12b for execution of the program code, e.g., an operating system (OS) which is used to launch applications and in particular the partitioning application of the present invention, results of which may be stored in a hard disk drive of the system (an I/O device 24) which may also store program instructions embodying the invention, or on another storage medium. While host processors 12a, 12b are executing program code, service processor 32 may enter a mode of monitoring and reporting any operating parameters or errors, such as the cooling fan speed and operation, thermal sensors, power supply regulators, and recoverable and non-recoverable errors reported by any of processors 12a, 12b, memory 18, and MC/HB 16. Service processor 32 may take further action based on the type of errors or defined thresholds.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable media may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette (magnetic), a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. The computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this invention, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, written for a variety of platforms such as an AIX environment or operating systems such as Windows 7 or Linux. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks. Such storage media excludes transitory media.

The computer program instructions may further be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Computer system 10 carries out program instructions for a novel partitioning process that dissolves assertion trees in the circuit design to allow the partitioner to optimize connectivity without being constrained by the assertion tree. Accordingly, a program embodying the invention may include conventional aspects of various partitioning and scheduling tools, and these details will become apparent to those skilled in the art upon reference to this disclosure.

Figure 3A:
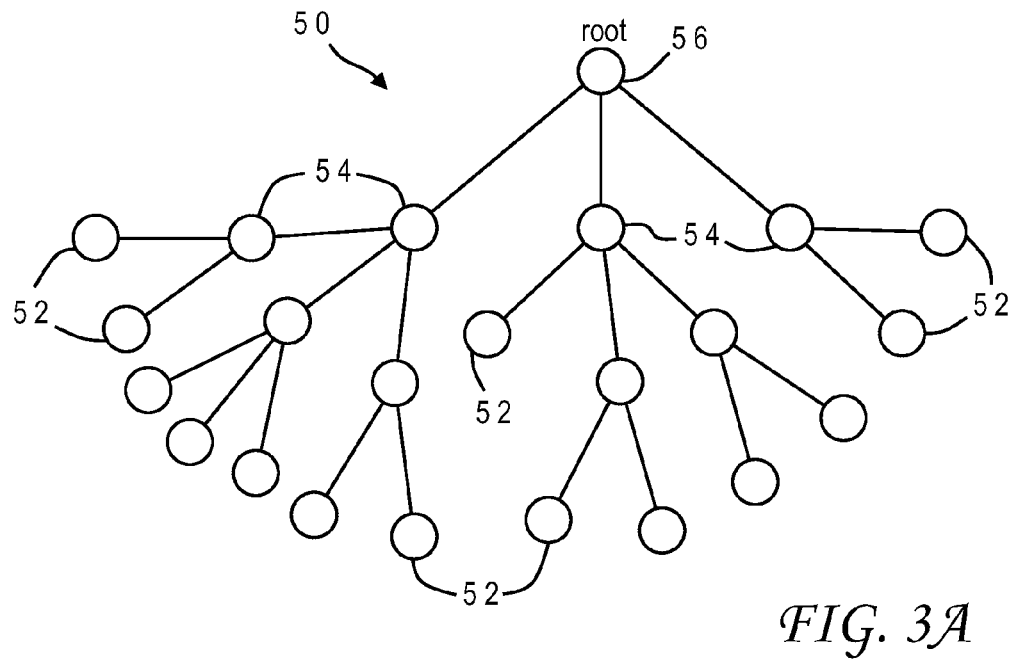
FIGS. 3A-3E are pictorial illustrations of an assertion tree for a circuit design which is dissolved and re-synthesized in accordance with one implementation of the present invention.

The present invention introduces a means to manipulate commutative structures in the assertion logic of the circuit design (uniform operator logic trees) so as to allow the dynamic mapping of primitives onto the resources of the machine. In this implementation the structures are commutative because they utilize OR gates to accumulate the assertions. In contrast to the traditional approach, the present invention dissolves the internal composition of certain netlist components in the early stages of compilation, while retaining the leaf node status information. One example of an assertion tree 50 which may be so dissolved is illustrated in FIG. 3A. Assertion tree 50 includes leaf (terminal) nodes 52 which provide input assertion signals to OR gates at intermediate nodes 54. The signals from intermediate nodes 54 are further accumulated in a root node 56 to provide the single assertion signal for the design under test.

Figure 3B:
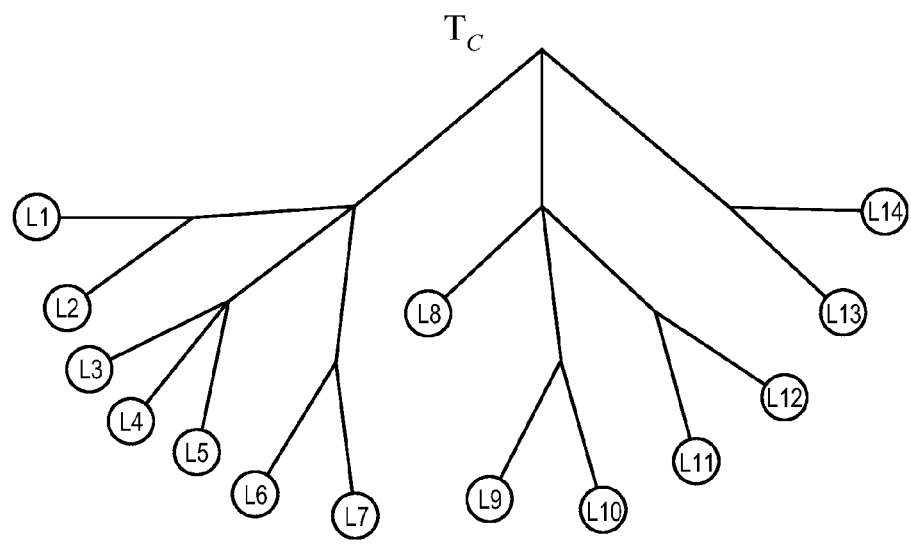

Computer system 10 can begin the inventive process by opportunistically detecting elements in the netlist (i.e., the uniform operator trees) which are amenable to resynthesis. The identification of candidate structures may be accomplished by explicitly marking assertion events, the root fail signal, and any other targeted logic, or through implicit functional detection of the uniform logic tree. In either case, the algorithm embodying the invention can recursively explore the fan-in of a signal, searching for a set of leaf gates that comprise the fringe of the structure. Once all such instances are found, their specific logical implementation is replaced with a tree cache $T_C$, as seen in FIG. 3B. The tree cache is a virtual tree with the same interface and function as the original tree 50, but does not specify any one implementation using base accelerator primitives. The internal gates of the original tree are removed from the netlist entirely, leaving only the leaf gates L1-L14.

Figure 3C:
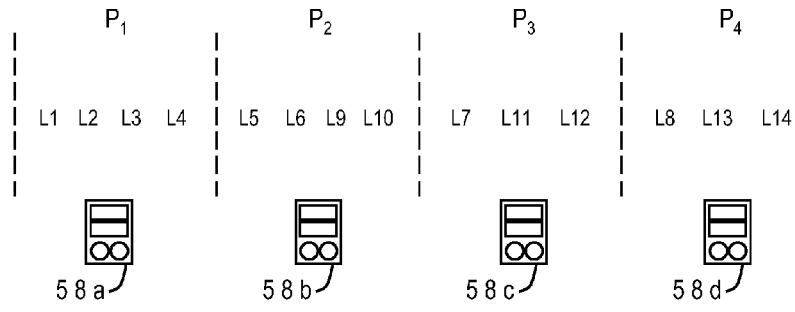

After the trees have been dissolved, the transformed netlist is used to guide the partitioner whose heuristics may now focus on optimizing the connectivity of the logic instead of the specific implementation of any tree. FIG. 3C depicts how the partitioner might assign the various leaf nodes L1-L14. In this example, there are four partitions $P_1$-$P_4$ each having associated machine resources 58a-58d, and nodes L1-L4 are assigned to partition $P_1$, nodes L5, L6, L9, L10 are assigned to partition $P_2$, nodes L7, L11, L12 are assigned to partition $P_3$, and nodes L8, L13, L14 are assigned to partition $P_4$. The machine resources may for example include logic processors, data memory, and instruction memory. The invention is not limited to any particular partitioning approach, although it is generally deemed preferable to use an engine that attempts to increase local connectivity by creating a partitionment that reduces connection cuts between partitions. The partitioner can still consider the leaf node information (from $T_C$) during its operation; for example, it may balance the leaf node distribution among the partitions similar to the balancing performed to accommodate the hardware imposed resource constraints, with or without taking rank considerations into account. Those skilled in the art will appreciate that the illustrated example is simplified as a typical assertion tree for a state-of-the-art microprocessor design may have millions of gates, and the accelerator may support dozens of partitions. While only the partitioning of the assertion leaf nodes are shown, it is understood that the partitioner will also be compiling the remainder of the netlist, that is, the circuit design for which the assertion logic was constructed.

Figure 3D:
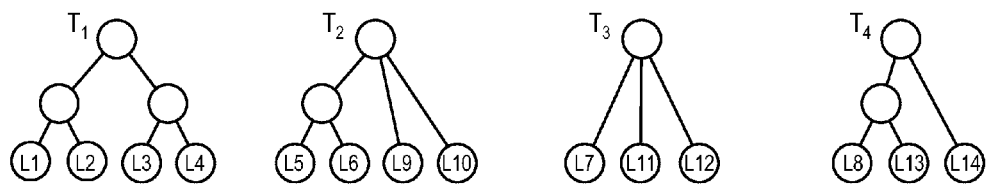

Once partitioning of the core model logic is complete, a given tree cache $T_C$ can be synthesized by creating a dedicated assertion tree (sub-tree) for each partition corresponding to the appropriate board or chip, as seen in FIG. 3D. For each partition P, any inputs to $T_C$ assigned to P are aggregated into a sub-tree $T_P$ using only base accelerator primitives. The topology of $T_P$ may be strictly balanced, or it may also reduce the depth to leaves that are likely to be critical (based on preliminary rank calculations). In the case that some scheduling has already been performed as part of the partitioning process, the internal tree primitives may also be distributed to minimize logic processor communication, exploit routing reuse, or consider signals as available for free from data memory read ports.

Figure 3E:
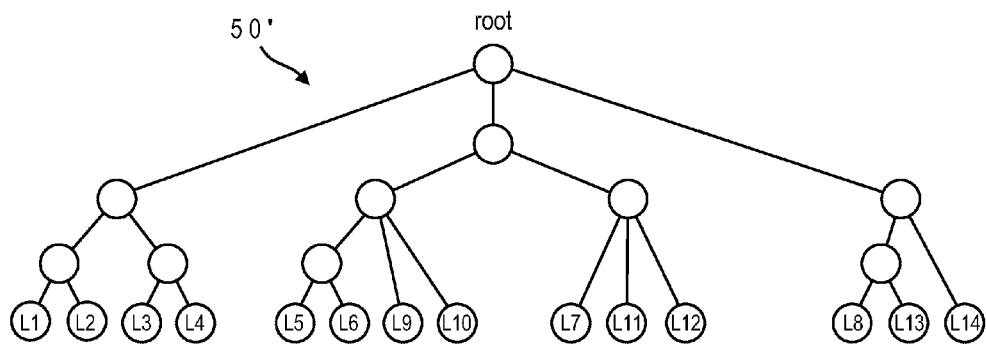

The roots of these individual sub-trees $T_P$ can then serve as the leaves in a larger master tree 50' connecting all of the partitions as illustrated in FIG. 3E. Again, the levels of master tree 50' may assign equal balance to all inputs, or may instead give preference to signals occurring later in the simulation depth. Since chip-to-chip connectivity is limited, the internal nodes of the tree can be positioned so as to prevent the unnecessary introduction of cross-chip buffers. For instance, consider a connective fabric that allows ten times more signals between adjacent chip indices (j, k) only if j is even. In such a case, a tree spanning chips {1, 2, 3} preferably connects chips 2 and 3 before joining the value with the output of chip 1.

The master tree 50' can be structurally distinct from the original tree 50; however, since the inputs are commutative, the functional equivalence of the model is preserved. By deferring the construction of these structures until their assignment to partitions is known, the present invention achieves a semblance of global optimization that would otherwise be lost on the local optimization performed by separate point-tools. Any symbol table (mapping elements of the netlist to unique identifiers and meaningful names) may require postprocessing if the ordering of internal tree primitives is used in any way to resolve breakpoints or perform efficient traceback.

Figure 4:
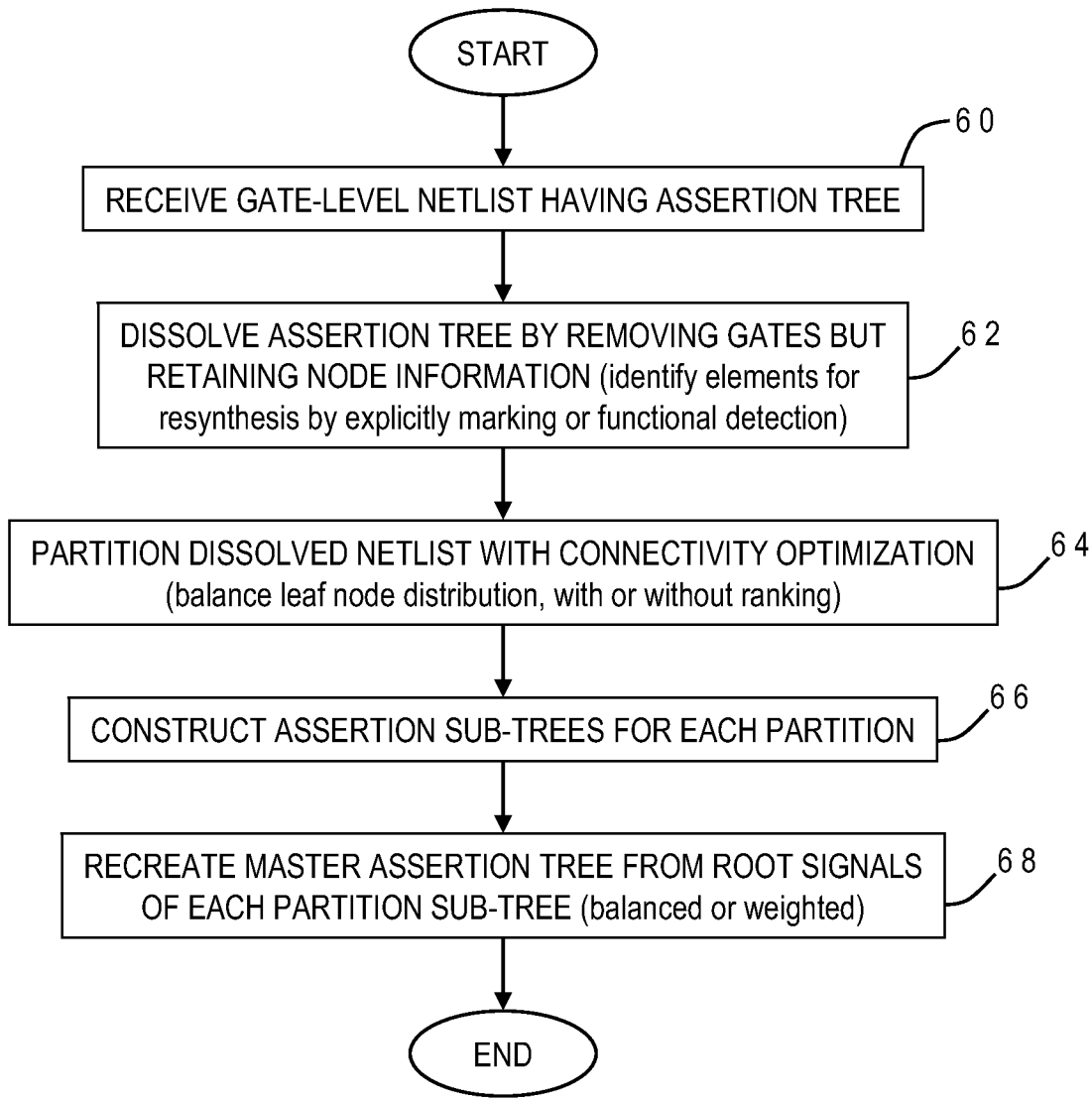
FIG. 4 is a chart illustrating the logical flow for guided partitioning of a circuit design having an assertion tree in accordance with one implementation of the present invention.

The invention may be further understood with reference to the chart of FIG. 4 which illustrates a logical process for compiling a circuit design in accordance with one implementation. The process begins when computer system 10 receives the circuit description (gate-level netlist) for the design under test, including assertion logic (60). The assertion tree is dissolved by removing internal gates while retaining node information (62). The dissolved netlist is partitioned, preferably with connectivity optimization, balancing the leaf node distribution (64). After partitioning, assertion sub-trees are constructed for each partition (66). The master assertion tree is then created by aggregating the root signals of the partition sub-trees (68).

By structurally resynthesizing uniform logic trees to explicitly accommodate simulation via hardware acceleration, the present invention achieves several advantages. There is no unwarranted strain on the partitioner to manage the fixed connectivity of stale assert logic. The logic of the resynthesized tree is also completely compatible with the desired partitioning for the remaining model. The invention further enables detailed synthesis of the final tree, and may consider a rich variety of accelerator constructs (such as logic processors and chip connectivity) to aggressively reduce routing requirements and simulation depth. By construction, the maximum number of cross-chip cuts along any path allowed is on the order of log($|C|$), where C is the number of chips (typically up to a few hundred). This figure can be contrasted with the number of cuts possible in the worst case using the traditional approach, where one cut may occur for each leaf node, which can be in the hundreds of thousands.

Although the invention has been described with reference to specific embodiments, this description is not meant to be construed in a limiting sense. Various modifications of the disclosed embodiments, as well as alternative embodiments of the invention, will become apparent to persons skilled in the art upon reference to the description of the invention. The novel methodology of the present invention may be applied more generically to structures originating not only from coverage analysis and assertion logic, but any pattern of user logic that employs a large scale uniform logic tree in its implementation. For example, the invention is also application to trees used for tristates, latch clocks, etc. The invention is further not limited to OR gate trees but is more widely applicable to any tree having commutative inputs, e.g., XOR gates. It is therefore contemplated that such modifications can be made without departing from the spirit or scope of the present invention as defined in the appended claims.

What is claimed is:

1. A method of compiling a circuit design for hardware-accelerated functional verification, comprising:
   receiving a description of the circuit design which includes a plurality of nodes interconnected to form a plurality of nets having at least one associated uniform operator logic tree by executing first instructions in a computer system;
   removing selected components from nodes of the uniform operator logic tree while retaining node information to create a dissolved circuit description for the circuit design by executing second instructions in the computer system;
   partitioning the circuit design into multiple partitions which map logical primitives of the dissolved circuit description to resources of a hardware accelerator by executing third instructions in the computer system;
   constructing uniform operator logic sub-trees for the partitions using the node information by executing fourth instructions in the computer system; and
   aggregating the uniform operator logic sub-trees into a master uniform operator logic tree for the circuit design by executing fifth instructions in the computer system.

2. The method of claim 1 wherein:
   the uniform operator logic tree is an assertion tree for verification of the circuit design;
   the uniform operator logic sub-trees are assertion sub-trees; and
   the master uniform operator logic tree is a master assertion tree.

3. The method of claim 2 wherein the selected components are identified by explicitly marking assertion events in the circuit description.

4. The method of claim 1 wherein:
   the circuit description is a gate-level netlist; and
   the removed components are internal gates of the uniform operator logic tree.

5. The method of claim 1 wherein said partitioning creates a partitionment which optimizes connectivity by reducing connection cuts between partitions.

6. The method of claim 1 wherein the selected components are identified by functional detection of the uniform operator logic tree.

7. The method of claim 1 wherein at least one of the uniform operator logic sub-trees has leaf nodes at varying depths based on ranks of the leaf nodes.

8. The method of claim 1 wherein the master uniform operator logic tree provides inputs from the uniform operator logic sub-trees at varying depths based on simulation depths for the sub-trees.

9. A computer system comprising:
   one or more processors which process program instructions;
   a memory device connected to said one or more processors; and
   program instructions residing in said memory device for compiling a circuit design for hardware-accelerated functional verification by receiving a description of the circuit design which includes a plurality of nodes interconnected to form a plurality of nets having at least one associated uniform operator logic tree, removing selected components from nodes of the uniform operator logic tree while retaining node information to create a dissolved circuit description for the circuit design, partitioning the circuit design into multiple partitions which map logical primitives of the dissolved circuit description to resources of a hardware accelerator, constructing uniform operator logic sub-trees for the partitions using the node information, and aggregating the uniform operator logic sub-trees into a master uniform operator logic tree for the circuit design.

10. The computer system of claim 9 wherein:
    the uniform operator logic tree is an assertion tree for verification of the circuit design;
    the uniform operator logic sub-trees are assertion sub-trees; and
    the master uniform operator logic tree is a master assertion tree.

11. The computer system of claim 9 wherein:
    the circuit description is a gate-level netlist; and
    the removed components are internal gates of the uniform operator logic tree.

12. The computer system of claim 9 wherein the partitioning creates a partitionment which optimizes connectivity by reducing connection cuts between partitions.

13. The computer system of claim 9 wherein the selected components are identified by functional detection of the uniform operator logic tree.

14. The computer system of claim 10 wherein the selected components are identified by explicitly marking assertion events in the circuit description.

15. The computer system of claim 9 wherein at least one of the uniform operator logic sub-trees has leaf nodes at varying depths based on ranks of the leaf nodes.

16. The computer system of claim 9 wherein the master uniform operator logic tree provides inputs from the uniform operator logic sub-trees at varying depths based on simulation depths for the sub-trees.

17. A computer program product comprising:
a computer-readable storage medium; and
program instructions residing in said storage medium for compiling a circuit design for hardware-accelerated functional verification by receiving a description of the circuit design which includes a plurality of nodes interconnected to form a plurality of nets having at least one associated uniform operator logic tree, removing selected components from nodes of the uniform operator logic tree while retaining node information to create a dissolved circuit description for the circuit design, partitioning the circuit design into multiple partitions which map logical primitives of the dissolved circuit description to resources of a hardware accelerator, constructing uniform operator logic sub-trees for the partitions using the node information, and aggregating the uniform operator logic sub-trees into a master uniform operator logic tree for the circuit design.

18. The computer program product of claim 17 wherein:
the uniform operator logic tree is an assertion tree for verification of the circuit design;
the uniform operator logic sub-trees are assertion sub-trees; and
the master uniform operator logic tree is a master assertion tree.

19. The computer program product of claim 17 wherein:
the circuit description is a gate-level netlist; and
the removed components are internal gates of the uniform operator logic tree.

20. The computer program product of claim 17 wherein the partitioning creates a partitionment which optimizes connectivity by reducing connection cuts between partitions.

21. The computer program product of claim 17 wherein the selected components are identified by functional detection of the uniform operator logic tree.

22. The computer program product of claim 18 wherein the selected components are identified by explicitly marking assertion events in the circuit description.

23. The computer program product of claim 17 wherein at least one of the uniform operator logic sub-trees has leaf nodes at varying depths based on ranks of the leaf nodes.

24. The computer program product of claim 17 wherein the master uniform operator logic tree provides inputs from the uniform operator logic sub-trees at varying depths based on simulation depths for the sub-trees.

* * * * *